United States Patent
Sendo

(10) Patent No.: US 11,761,361 B2
(45) Date of Patent: Sep. 19, 2023

(54) METHOD FOR MANUFACTURING PILLAR-SHAPED HONEYCOMB STRUCTURE FILTER

(71) Applicant: NGK INSULATORS, LTD., Nagoya (JP)

(72) Inventor: Koichi Sendo, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 221 days.

(21) Appl. No.: 17/152,958

(22) Filed: Jan. 20, 2021

(65) Prior Publication Data

US 2021/0301695 A1    Sep. 30, 2021

(30) Foreign Application Priority Data

Mar. 26, 2020   (JP) .................................. 2020-056623
Jan. 6, 2021    (JP) .................................. 2021-000983

(51) Int. Cl.
   *C04B 41/45*     (2006.01)
   *C04B 41/00*     (2006.01)
   (Continued)

(52) U.S. Cl.
   CPC ............ *F01N 3/0222* (2013.01); *B01J 35/04* (2013.01); *C04B 35/565* (2013.01);
   (Continued)

(58) Field of Classification Search
   CPC ............ C04B 38/0006; C04B 38/0009; C04B 38/0012; C04B 41/4543; C04B 41/0072; C04B 41/4558; C04B 2235/6567
   (Continued)

(56) References Cited

U.S. PATENT DOCUMENTS 8,277,880 B2 * 10/2012 Sato ...................... C04B 41/457
                                                     427/294
9,486,728 B2    11/2016 Jinbo et al.
(Continued)

FOREIGN PATENT DOCUMENTS

JP      2000-020220 A1    1/2000
JP      2000-202220 A1    7/2000
(Continued)

OTHER PUBLICATIONS

Aerosols from The National Institute for Occupational Safety and Health (NIOSH). Retrieved from <https://www.cdc.gov/niosh/topics/aerosols/default.html> on Jan. 20, 2022. Page dated Jun. 29, 2010. (Year: 2010).*

(Continued)

*Primary Examiner* — William P Fletcher, III
(74) *Attorney, Agent, or Firm* — BURR PATENT LAW, PLLC

(57) ABSTRACT

A method for manufacturing a pillar-shaped honeycomb structure filter including preparing a pillar-shaped honeycomb structure having a plurality of first cells and a plurality of second cells that are alternately arranged adjacent to each other with a porous partition wall interposed therebetween; adhering ceramic particles containing 50% by mass or more in total of one or two selected from SiC and SiN to a surface of the first cells; and performing a heat-oxidation treatment on the pillar-shaped honeycomb structure in which the ceramic particles are adhered to the surface of the first cells to form a porous film comprised of the ceramic particles having an oxide film thereon so as to satisfy: (1) $0.05 \leq T \leq 0.5$; (2) $0.05 \leq T/D50$; and (3) $4 \leq \{(W_1-W_0)/W_0 \times 100\}/D50$.

5 Claims, 5 Drawing Sheets

(51) Int. Cl.
*F01N 3/022* (2006.01)
*B01J 35/04* (2006.01)
*C04B 35/565* (2006.01)
*C04B 38/00* (2006.01)
*B28B 11/24* (2006.01)

(52) U.S. Cl.
CPC ...... *C04B 38/0009* (2013.01); *C04B 41/4507* (2013.01); *C04B 41/4543* (2013.01); *B28B 11/24* (2013.01); *C04B 41/0072* (2013.01); *C04B 41/45* (2013.01); *C04B 41/455* (2013.01); *C04B 41/4558* (2013.01); *C04B 2235/65* (2013.01); *C04B 2235/6567* (2013.01); *C04B 2235/6583* (2013.01)

(58) Field of Classification Search
USPC .................................................. 427/230–239
See application file for complete search history.

(56) References Cited

U.S. PATENT DOCUMENTS

| | | |
|---|---|---|
| 2012/0009092 A1 | 1/2012 | Mizutani et al. |
| 2012/0058019 A1* | 3/2012 | Mizutani ................. F01N 3/022 422/178 |
| 2019/0048771 A1* | 2/2019 | Liu ..................... B01D 46/2429 |
| 2020/0254435 A1 | 8/2020 | Wu et al. |
| 2020/0353401 A1 | 11/2020 | Beall et al. |
| 2021/0236976 A1* | 8/2021 | Foerster ................. B01D 46/00 |
| 2021/0239018 A1* | 8/2021 | Deibel ................. F01N 3/0842 |

FOREIGN PATENT DOCUMENTS

| | | |
|---|---|---|
| JP | 2001-079321 A1 | 3/2001 |
| WO | 2019/089806 A1 | 5/2019 |

OTHER PUBLICATIONS

German Office Action (Application No. 10 2021 000 386.1) dated Nov. 29, 2021 (with English translation).

* cited by examiner

Exhaust gas

METHOD FOR MANUFACTURING PILLAR-SHAPED HONEYCOMB STRUCTURE FILTER

FIELD OF THE INVENTION

The present invention relates to a method for manufacturing a pillar-shaped honeycomb structure filter.

BACKGROUND OF THE INVENTION

Particulate matter such as soot (hereinafter referred to as PM) is contained in the exhaust gas discharged from internal combustion engines such as a diesel engine and a gasoline engine. Soot is harmful to the human body and its emission is regulated. Currently, in order to comply with exhaust gas regulations, filters typified by DPF and GPF, in which exhaust gas is passed through breathable partition walls with small pores to filtrate PM such as soot, are widely used.

As a filter for collecting PM, there has been known a wall flow type pillar-shaped honeycomb structure (hereinafter, also referred to as "pillar-shaped honeycomb structure filter") comprising a plurality of first cells extending in a height direction from an inlet side end surface to an outlet side end surface, opening on the inlet side end surface and having a sealing portion on the outlet side end surface, and a plurality of second cells arranged adjacent to the first cells with a partition wall interposed therebetween, extending in the height direction from the inlet side end surface to the outlet side end surface, having a sealing portion on the inlet side end surface and opening on the outlet side end surface.

In recent years, with the tightening of exhaust gas regulations, stricter PM emission standards (PN regulation: particulate number regulation) have been introduced, and filters are required to have high PM collection performance (high PN collection efficiency). Accordingly, it has been proposed to additionally form a layer for collecting PM on the surface of the cells.

Patent Literature 1 discloses a method for manufacturing a honeycomb filter for dust collection in which at least one layer of a porous film having a smaller pore diameter than a honeycomb-shaped porous substrate is formed on a surface of the porous substrate, the method comprising providing the inside of the cells of the porous substrate with a slurry prepared from aggregate particles having a 50% particle size ($D_{50}$: μm) of ⅔-fold or more and 1-fold or less of an average pore size (P: μm) of the porous substrate and a particle size distribution in the range of the following formula (1); forming a film by removing the moisture in the slurry through the pores of the porous substrate; and then performing firing.

$$D_{50}/(D_{50}-D_{10}) \geq 1.5 \quad (1)$$

(wherein, $D_{50}$: 50% particle size (μm), $D_{10}$: 10% particle size (μm))

According to Patent Literature 1, by forming a film using a slurry prepared from aggregate particles having an average particle size and particle size distribution within predetermined ranges, a honeycomb filter having a high collection efficiency and a low-pressure loss can be easily manufactured with a simple apparatus, and moreover, a large number of filters can be manufactured with uniform quality.

Patent Literature 2 discloses a method for manufacturing a multilayer structure honeycomb filter, comprising providing each cell of a substrate having a honeycomb structure with a slurry of ceramic particles having an average particle size of ⅔-fold or more and 1-fold or less of an average pore diameter of the substrate; removing the moisture in the slurry through the pores of the substrate to adhere the ceramic particles to a surface of the substrate; and then performing firing to form a coat layer on the surface of the substrate.

According to Patent Literature 2, this multilayer structure honeycomb filter has a high collection efficiency, a low-pressure loss, and a reduced-pressure loss increase rate.

Patent Literature 3 discloses a method for manufacturing a honeycomb structure filter, comprising a step of depositing an inorganic layer precursor on a honeycomb structure made of porous ceramics by flowing a gaseous carrier containing the inorganic layer precursor through the honeycomb structure; and forming a porous inorganic layer with a porosity of 90% or more and an average thickness of 0.5 μm to 30 μm by firing the inorganic layer precursor so that it is bonded to the honeycomb structure made of porous ceramics. Patent Literature 3 discloses that the high porosity of the porous inorganic layer eliminates the influence on the pressure loss of the honeycomb structure. Further, Patent Literature 3 also discloses that ammonium chloride, which is a separandum, is used to form a porous film, but there is a concern about safety.

CITATION LIST

Patent Literature

[Patent Literature 1] Japanese Patent Application Publication No. 2001-79321
[Patent Literature 2] Japanese Patent Application Publication No. 2000-202220
[Patent Literature 3] WO 2019/089806

SUMMARY OF THE INVENTION

In order to improve the PM collection performance of a pillar-shaped honeycomb structure filter, it has been considered effective to form a layer for collecting PM on the surface of the cells, but there is still room for improvement of such a layer. Specifically, in the prior art, there is a lack of study on solutions for preventing the layer for collecting PM formed on the surface from being peeled off from the cells. Therefore, it would be advantageous if the peeling resistance of the layer for collecting PM could be improved.

In view of the above circumstances, in one embodiment of the present invention, an object is to provide a method for manufacturing a pillar-shaped honeycomb structure filter that can contribute to improvement of peeling resistance of a layer for collecting PM formed on the surface of cells (in the present invention, it is referred to as a "porous film").

As a result of diligent studies to solve the above problems, the present inventor has found that using ceramic particles containing SiC and/or SiN as a raw material for the porous film to form an oxide film on the surface is effective in improving the peeling resistance of the porous film. The present invention has been completed based on the above findings, and is exemplified as below.

[1]
A method for manufacturing a pillar-shaped honeycomb structure filter, comprising:
a step of preparing a pillar-shaped honeycomb structure comprising a plurality of first cells extending from an inlet side end surface to an outlet side end surface, opening on the inlet side end surface and having a sealing portion on the outlet side end surface, and a plurality of second cells extending from the inlet side end surface to the outlet side end surface, having a sealing portion on the inlet side end surface and opening on the outlet side end surface, the first cells and the second cells being alternately arranged adjacent to each other with a porous partition wall interposed therebetween;

a step of adhering ceramic particles to a surface of the first cells by injecting an aerosol containing the ceramic particles toward the inlet side end surface while applying a suction force to the outlet side end surface to suck the injected aerosol from the inlet side end surface, the ceramic particles containing 50% by mass or more in total of one or two selected from SiC and SiN, and having a median diameter (D50) in a volume-based cumulative particle size distribution measured by a laser diffraction/scattering method of 0.1 to 6.0 μm; and a step of performing a heat-oxidation treatment on the pillar-shaped honeycomb structure in which the ceramic particles are adhered to the surface of the first cells to form a porous film comprised of the ceramic particles having an oxide film thereon so as to satisfy following relational expressions (1) to (3).

$$0.05 \leq T \leq 0.5 \quad (1)$$

$$0.05 \leq T/D50 \quad (2)$$

$$4 \leq \{(W_1 - W_0)/W_0 \times 100\}/D50 \quad (3)$$

(wherein,

T (unit: μm) represents an average thickness of the oxide film;

D50 (unit: μm) represents a median diameter of the ceramic particles in the volume-based cumulative particle size distribution measured by a laser diffraction/scattering method;

$W_0$ (unit: g) represents a mass of the ceramic particles adhered to the pillar-shaped honeycomb structure before the heat-oxidation treatment; and $W_1$ (unit: g) represents the mass of the ceramic particles adhered to the pillar-shaped honeycomb structure after the heat-oxidation treatment.)

[2]

The method for manufacturing a pillar-shaped honeycomb structure filter according to [1], wherein the porous film has an average film thickness of 2 to 50 μm.

[3]

The method for manufacturing a pillar-shaped honeycomb structure filter according to [1] or [2], wherein the heat-oxidation treatment is performed so as to satisfy $4 \leq (W_1 - W_0)/W_0 \times 100 \leq 50$.

[4]

The method for manufacturing a pillar-shaped honeycomb structure filter according to any one of [1] to [3], wherein the heat-oxidation treatment is performed under a condition of keeping the pillar-shaped honeycomb structure at a maximum temperature of 1000° C. or higher for 1 hour or longer.

[5]

The method for manufacturing a pillar-shaped honeycomb structure filter according to any one of [1] to [4], wherein the porous partition wall contains 50% by mass or more of cordierite.

According to the method for manufacturing a pillar-shaped honeycomb structure filter according to one embodiment of the present invention, it is possible to obtain a pillar-shaped honeycomb structure filter having an improved peeling resistance of the porous film formed on the surface of the cells.

DETAILED DESCRIPTION OF THE INVENTION

Hereinafter, embodiments of the present invention will be described in detail with reference to the drawings. It should be understood that the present invention is not limited to the following embodiments, and any change, improvement or the like of the design may be appropriately added based on ordinary knowledge of those skilled in the art without departing from the spirit of the present invention.

<1. Pillar-Shaped Honeycomb Structure Filter>

According to one embodiment of the present invention, there is provided a method for manufacturing a pillar-shaped honeycomb structure filter. The pillar-shaped honeycomb structure filter can be used as a DPF (Diesel Particulate Filter) and a GPF (Gasoline Particulate Filter) that collect soot installed in an exhaust gas line from a combustion device, typically an engine mounted on a vehicle. The pillar-shaped honeycomb structure filter according to the present invention can be installed in an exhaust pipe, for example.

Figure 1:
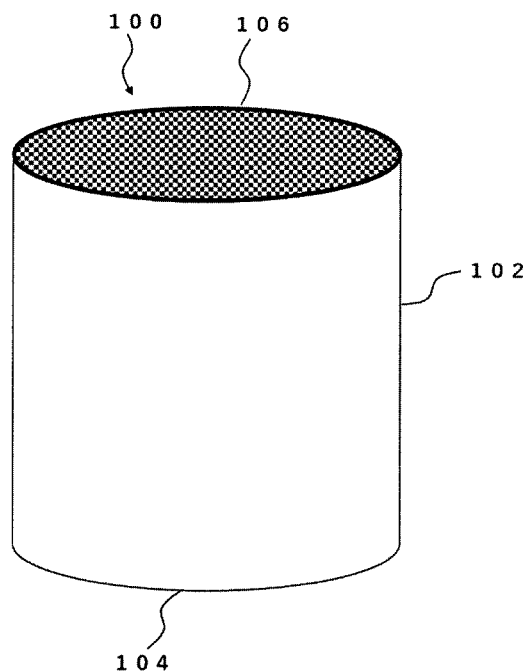
FIG. 1 is a perspective view schematically showing an example of a pillar-shaped honeycomb structure filter.
Figure 2:
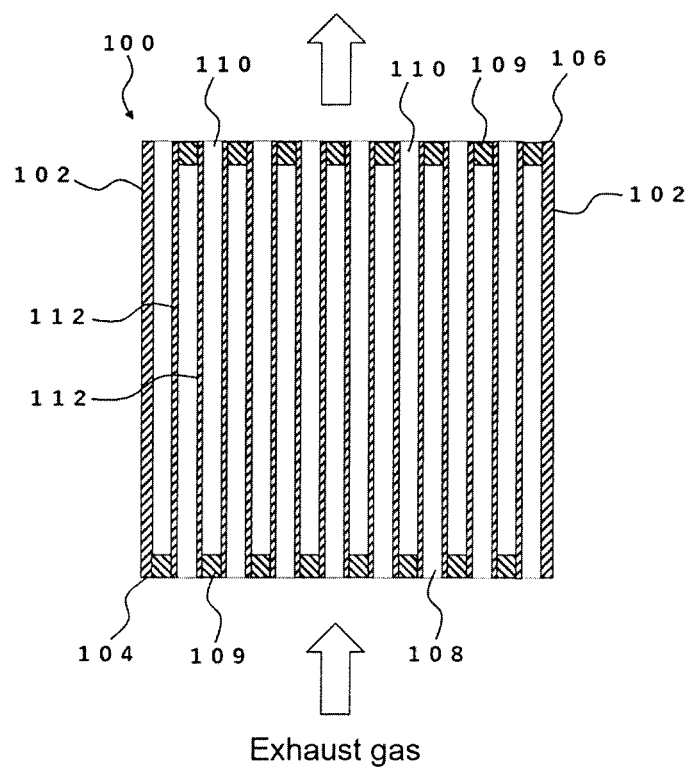
FIG. 2 is a schematic cross-sectional view when one example of a pillar-shaped honeycomb structure filter is observed in a cross-section parallel to the direction in which the cells extend.

FIGS. 1 and 2 illustrate a schematic perspective view and a cross-sectional view of a pillar-shaped honeycomb structure filter (100), respectively. This pillar-shaped honeycomb structure filter (100) comprises an outer peripheral side wall (102), and a plurality of first cells (108) provided on the inner peripheral side of the outer peripheral side wall (102), the first cells (108) extending from an inlet side end surface (104) to an outlet side end surface (106), opening on the inlet side end surface (104) and having a sealing portion (109) on the outlet side end surface (106), and a plurality of second cells (110) provided on the inner peripheral side of the outer peripheral side wall (102), the second cells (110) extending from the inlet side end surface (104) to the outlet side end surface (106), having a sealing portion (109) on the inlet side end surface (104) and opening on the outlet side end surface (106). In this pillar-shaped honeycomb structure (100), since the first cells (108) and the second cells (110) are alternately arranged adjacent to each other with the porous partition walls (112) interposed therebetween, the inlet side end surface (104) and the outlet side end surface (106) each have a honeycomb shape.

When the exhaust gas containing particulate matter (PM) such as soot is supplied to the inlet side end surface (104) which is on the upstream side of the pillar-shaped honeycomb structure filter (100), the exhaust gas is introduced into the first cells (108) and proceeds downstream in the first cells (108). Since the first cells (108) have the sealing portion (109) on the outlet side end surface (106) which is on the downstream side, the exhaust gas penetrates through the porous partition walls (112) partitioning the first cells (108) and the second cells (110) and flows into the second cells (110). Since particulate matter cannot penetrate the partition walls (112), it is collected and deposited in the first cells (108). After the particulate matter is removed, the clean exhaust gas that has flowed into the second cells (110) proceeds downstream in the second cells (110) and flows out of the outlet side end surface (106) is on the downstream side.

Figure 3:
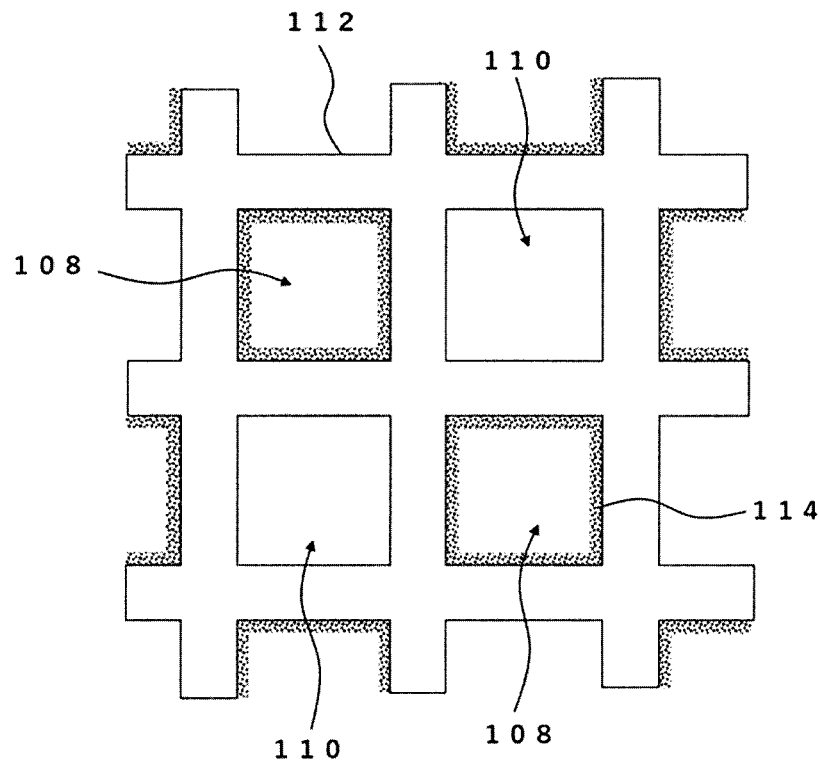
FIG. 3 is a schematic partially enlarged view of a pillar-shaped honeycomb structure filter observed in a cross-section orthogonal to the direction in which the cells extend.

FIG. 3 shows a schematic partially enlarged view when the pillar-shaped honeycomb structure filter (100) is observed in a cross-section orthogonal to the direction in which the cells (108, 110) extend. The surface of each of the first cells (108) of the pillar-shaped honeycomb structure filter (100) (the same as the surface of the partition walls (112) partitioning the first cells (108)) is covered with porous films (114) made of ceramics.

The pillar-shaped honeycomb structure filter may carry a PM combustion catalyst that assists PM combustion such as soot, an oxidation catalyst (DOC), a SCR catalyst and an NSR catalyst for removing nitrogen oxides (NOx), and a three-way catalyst that can remove hydrocarbon (HC), carbon monoxide (CO) and nitrogen oxides (NOx) at the same time. However, it is preferable that the pillar-shaped honeycomb structure filter according to the present embodiment should not carry a catalyst. This is due to the increase in the pressure loss.

The pillar-shaped honeycomb structure filter can also be provided as an integrally formed product. Further, the pillar-shaped honeycomb structure filter can also be provided as a segment joint body by joining and integrating segments of a plurality of pillar-shaped honeycomb structure filters, each having an outer peripheral side wall, with each other on the side surfaces. By providing the pillar-shaped honeycomb structure filter as a segment joint body, the thermal shock resistance can be enhanced.

<2. Preparation of Pillar-Shaped Honeycomb Structure>

In one embodiment of the method for manufacturing a pillar-shaped honeycomb structure filter according to the present invention, a step of preparing a pillar-shaped honeycomb structure is carried out. The pillar-shaped honeycomb structure comprises an outer peripheral side wall, a plurality of first cells provided on the inner peripheral side of the outer peripheral side wall, the first cells extending from an inlet side end surface to an outlet side end surface, opening on the inlet side end surface and having a sealing portion on the outlet side end surface, and a plurality of second cells provided on the inner peripheral side of the outer peripheral side wall, the second cells extending from the inlet side end surface to the outlet side end surface, having a sealing portion on the inlet side end surface and opening on the outlet side end surface, the first cells and the second cells being alternately arranged adjacent to each other with a porous partition wall interposed therebetween.

Examples of the material constituting the porous partition walls and the outer peripheral side wall of the pillar-shaped honeycomb structure filter include, but are not limited to, porous ceramics. Examples of ceramics include cordierite, mullite, zirconium phosphate, aluminum titanate, silicon carbide (SiC), silicon-silicon carbide composite (for example, Si-bonded SiC), cordierite-silicon carbide composite, zircon, zirconia, spinel, indialite, sapphirine, corundum, titania, silicon nitride, and the like. As the ceramics, one type may be contained alone, or two or more types may be contained at the same time. In the case of filter applications such as DPF and GPF, cordierite can be preferably used as the ceramics. Therefore, the porous partition walls and the outer peripheral side wall preferably contain 50% by mass or more of cordierite, more preferably 70% by mass or more, and even more preferably 90% by mass or more of cordierite.

The end surface shape of the pillar-shaped honeycomb structure filter is not limited, and may be, for example, a round shape such as a circle, an ellipse, a race track shape, or an oval shape, or a polygon such as a triangle or a quadrangle. The pillar-shaped honeycomb structure (100) of FIG. 1 has a circular end surface and is cylindrical as a whole.

The shape of the cells in the cross-section perpendicular to the flow path direction of the cells is not limited, but is preferably a quadrangle, a hexagon, an octagon, or a combination thereof. Among these, squares and hexagons are preferred. By making the shape of the cells in this way, it is possible to reduce the pressure loss when a fluid passes through the pillar-shaped honeycomb structure.

The average pore diameter of the partition walls is preferably 20 μm or less, more preferably 18 μm or less, and even more preferably 16 μm or less. When the average pore diameter of the partition walls is in the above range, the collection efficiency of particulate matter is significantly improved. In addition, the average pore diameter of the partition walls is preferably 4 μm or more, more preferably 6 μm or more, and even more preferably 8 μm or more. When the average pore diameter of the partition walls is in the above range, it is possible to suppress the pressure loss decrease. The average pore size of the partition walls refers to the value measured with a mercury intrusion porosimeter in accordance with JIS-R1655: 2003.

The porosity of the partition walls is preferably 40% or more, more preferably 45% or more, and even more preferably 50% or more, from the viewpoint of suppressing the pressure loss of the exhaust gas. Further, the porosity of the partition walls is preferably 80% or less, more preferably 75% or less, and even more preferably 70% or less, from the viewpoint of ensuring the strength of the pillar-shaped honeycomb structure filter. The porosity of the partition walls refers to the value measured with a mercury intrusion porosimeter in accordance with JIS-R1655: 2003.

The upper limit of the average thickness of the partition walls in the pillar-shaped honeycomb structure filter is preferably 0.59 mm or less, more preferably 0.33 mm or less, and even more preferably 0.26 mm or less, from the viewpoint of suppressing the pressure loss. However, from the viewpoint of ensuring the strength of the pillar-shaped honeycomb structure filter, the lower limit of the average thickness of the partition walls is preferably 0.15 mm or more, more preferably 0.16 mm or more, and even more preferably 0.18 mm or more. In the present specification, the thickness of the partition walls refers to the length of a line segment that crosses the partition wall when the centers of gravity of adjacent cells are connected by this line segment in a cross-section orthogonal to the flow path of the cells. The average thickness of partition walls refers to the average value of the thickness of all partition walls.

The cell density (the number of cells per unit cross-sectional area perpendicular to the direction in which the cell extends) is not particularly limited, but may be, for example, 6 to 2000 cells/square inch (0.9 to 311 cells/cm$^2$), more preferably 50 to 1000 cells/square inch (7.8 to 155 cells/cm$^2$), particularly preferably 100 to 400 cells/square inch (15.5 to 62.0 cells/cm$^2$).

A method for manufacturing a pillar-shaped honeycomb structure will be exemplified as below. First, a green body is formed by kneading a raw material composition comprising a ceramic raw material, a dispersion medium, a pore-forming material, and a binder. Next, the green body is extruded to form a honeycomb formed body as desired. Additives such as a dispersant can be added to the raw material composition as needed. For extrusion, a die having a desired overall shape, cell shape, partition wall thickness, cell density and the like can be used.

After the pillar-shaped honeycomb formed body is dried, sealing portions are formed at predetermined positions on both end surfaces of the pillar-shaped honeycomb formed body, and then the sealing portions are dried to obtain a pillar-shaped honeycomb formed body having the sealing portions. After that, by degreasing and firing the pillar-shaped honeycomb formed body, a pillar-shaped honeycomb structure is manufactured.

As the ceramic raw material, a raw material capable of forming the above-mentioned ceramics after firing can be used. The ceramic raw material can be provided, for example, in the form of powder. Examples of the ceramic raw material include a raw material for obtaining ceramics such as cordierite, mullite, zirconium phosphate, aluminum titanate, silicon carbide (SiC), silicon-silicon carbide composite (for example, Si-bonded SiC), cordierite-silicon carbide composite, zircon, zirconia, spinel, indialite, sapphirine, corundum, titania, silicon nitride, and the like. Specific examples thereof include, but are not limited to, silica, talc, alumina, kaolin, serpentine, pyrophyllite, brucite, boehmite, mullite, magnesite, and aluminum hydroxide. As the ceramic raw material, one type may be used alone, or two or more types may be used in combination.

In the case of filter applications such as DPF and GPF, cordierite can be preferably used as the ceramics. In this case, a cordierite-forming raw material can be used as the ceramic raw material. The cordierite-forming raw material is a raw material that becomes cordierite by firing. It is desirable that the cordierite-forming raw material have a chemical composition of alumina ($Al_2O_3$) (including the amount of aluminum hydroxide that converts to alumina): 30 to 45% by mass, magnesia (MgO): 11 to 17% by mass, and silica ($SiO_2$): 42 to 57% by mass.

Examples of the dispersion medium include water or a mixed solvent of water and an organic solvent such as alcohol, and water can be particularly preferably used.

The pore-forming material is not particularly limited as long as it forms pores after firing, and examples thereof include, wheat flour, starch, foamed resin, water-absorbing resin, porous silica, carbon (for example, graphite), ceramic balloon, polyethylene, polystyrene, polypropylene, nylon, polyester, acrylic and phenol, and the like. As the pore-forming material, one type may be used alone, or two or more types may be used in combination. From the viewpoint of increasing the porosity of the fired body, the amount of the pore-forming material is preferably 0.5 parts by mass or more, more preferably 2 parts by mass or more, and even more preferably 3 parts by mass or more with respect to 100 parts by mass of the ceramic raw material. From the viewpoint of ensuring the strength of the fired body, the amount of the pore-forming material is preferably 10 parts by mass or less, more preferably 7 parts by mass or less, and even more preferably 4 parts by mass or less with respect to 100 parts by mass of the ceramic raw material.

Examples of the binder include organic binders such as methyl cellulose, hydroxypropyl methyl cellulose, hydroxyethyl cellulose, carboxymethyl cellulose, and polyvinyl alcohol. In particular, it is preferable to use methyl cellulose and hydroxypropyl methyl cellulose in combination. Further, from the viewpoint of increasing the strength of the honeycomb formed body, the amount of the binder is preferably 4 parts by mass or more, more preferably 5 parts by mass or more, and even more preferably 6 parts by mass or more with respect to 100 parts by mass of the ceramic raw material. From the viewpoint of suppressing the occurrence of crack due to abnormal heat generation in the firing process, the amount of the binder is preferably 9 parts by mass or less, more preferably 8 parts by mass or less, and even more preferably 7 parts by mass or less with respect to 100 parts by mass of the ceramic raw material. As the binder, one type may be used alone, or two or more types may be used in combination.

As the dispersant, ethylene glycol, dextrin, fatty acid soap, polyether polyol and the like can be used. As the dispersant, one type may be used alone, or two or more types may be used in combination. The content of the dispersant is preferably 0 to 2 parts by mass with respect to 100 parts by mass of the ceramic raw material.

The method for sealing the end surfaces of the pillar-shaped honeycomb formed body is not particularly limited, and a well-known method can be adopted. The material of the sealing portion is not particularly limited, but ceramics are preferable from the viewpoint of strength and heat resistance. As the ceramics, it is preferably a ceramic material comprising at least one selected from the group consisting of cordierite, mullite, zircon, zirconium phosphate, aluminum titanate, silicon carbide, silicon nitride, zirconia, spinel, indialite, sapphirine, corundum, and titania. It is even more preferable that the sealing portion has the same material composition as the partition walls of the honeycomb formed body because the expansion coefficient at the time of firing can be the same so that the durability is improved.

After drying the honeycomb formed body, a pillar-shaped honeycomb structure can be manufactured by performing degreasing and firing. As for the conditions of the drying process, the degreasing process, and the firing process, known conditions may be adopted according to the material composition of the honeycomb formed body, and no particular explanation is required. However, specific examples of the conditions are given below.

In the drying process, conventionally known drying methods such as hot air drying, microwave drying, dielectric drying, decompression drying, vacuum drying, and freeze drying can be used. Among these, a drying method that combines hot air drying with microwave drying or dielectric drying is preferable in that the entire formed body can be dried quickly and uniformly.

When forming the sealing portions, it is preferable to form the sealing portions on both end surfaces of the dried honeycomb formed body and then dry the sealing portions. The sealing portions are formed at predetermined positions so that a plurality of first cells extending from the inlet side end surface to the outlet side end surface, opening on the inlet side end surface and having a sealing portion on the outlet side end surface, and a plurality of second cells extending from the inlet side end surface to the outlet side end surface, having a sealing portion on the inlet side end surface and opening on the outlet side end surface, are alternately arranged adjacent to each other with the porous partition wall interposed therebetween.

Next, the degreasing process will be described. The combustion temperature of the binder is about 200° C., and the combustion temperature of the pore-forming material is about 300 to 1000° C. Therefore, the degreasing process may be carried out by heating the honeycomb formed body in the range of about 200 to 1000° C. The heating time is not particularly limited, but is normally about 10 to 100 hours. The honeycomb formed body after the degreasing step is called a calcined body.

The firing process depends on the material composition of the honeycomb formed body, but can be performed, for example, by heating the calcined body to 1350 to 1600° C. and holding it for 3 to 10 hours. In this way, a pillar-shaped honeycomb structure comprising a plurality of first cells extending from the inlet side end surface to the outlet side end surface, opening on the inlet side end surface and having a sealing portion on the outlet side end surface, and a plurality of second cells extending from the inlet side end surface to the outlet side end surface, having a sealing portion on the inlet side end surface and opening on the outlet side end surface, the first cells and the second cells being alternately arranged adjacent to each other with the porous partition wall interposed therebetween can be prepared.

<3. Adhesion of Ceramic Particles to the Surface of First Cells>

Next, ceramic particles are adhered to the surface of the first cells (the same as the surface of the partition walls partitioning the first cells) of the pillar-shaped honeycomb structure filter that has undergone the firing process. In one embodiment of the method for manufacturing a pillar-shaped honeycomb structure filter according to the present invention, a step of adhering ceramic particles to the surface of the first cells is carried out by injecting an aerosol containing the ceramic particles toward the inlet side end surface while applying a suction force to the outlet side end surface to suck the injected aerosol from the inlet side end surface, the ceramic particles containing 50% by mass or more in total of one or two selected from SiC and SiN, and having a median diameter (D50) in a volume-based cumulative particle size distribution measured by a laser diffraction/scattering method of 0.1 to 6.0 µm.

As the ceramic particles, ceramic particles containing 50% by mass or more in total of one or two selected from SiC (silicon carbide) and SiN (silicon nitride) can be preferably used. This because the ceramic particles are a constituent material of a porous film, SiC (silicon carbide) and SiN (silicon nitride) form an oxide film on the surface by the heat-oxidation treatment described later, and a porous film having improved peel resistance can be obtained. The oxide film contains $SiO_2$ as a constituent component. Although the present invention is limited is not intended to be restricted by any theory, it is considered that the SiC (silicon carbide) and/or the SiN (silicon nitride) particles having an oxide film formed on the surface improve the adhesive force between the particles, and significantly improve the adhesion to cell surface, by sharing the oxide film with each other.

The ceramic particles more preferably contain 70% by mass or more, and even more preferably 90% by mass or more in total of one or two selected from SiC (silicon carbide) and SiN (silicon nitride).

The upper limit of median diameter (D50) of the ceramic particles in the aerosol in a volume-based cumulative particle size distribution measured by a laser diffraction/scattering method is preferably 6.0 µm or less, more preferably 4.0 µm or less, more preferably 2.0 µm or less, more preferably 1.0 µm or less, and even more preferably 0.5 µm or less. The lower limit of D50 of the ceramic particles is not particularly limited, but from the viewpoint of ease of preparation, it is usually 0.1 µm or more.

Figure 5:
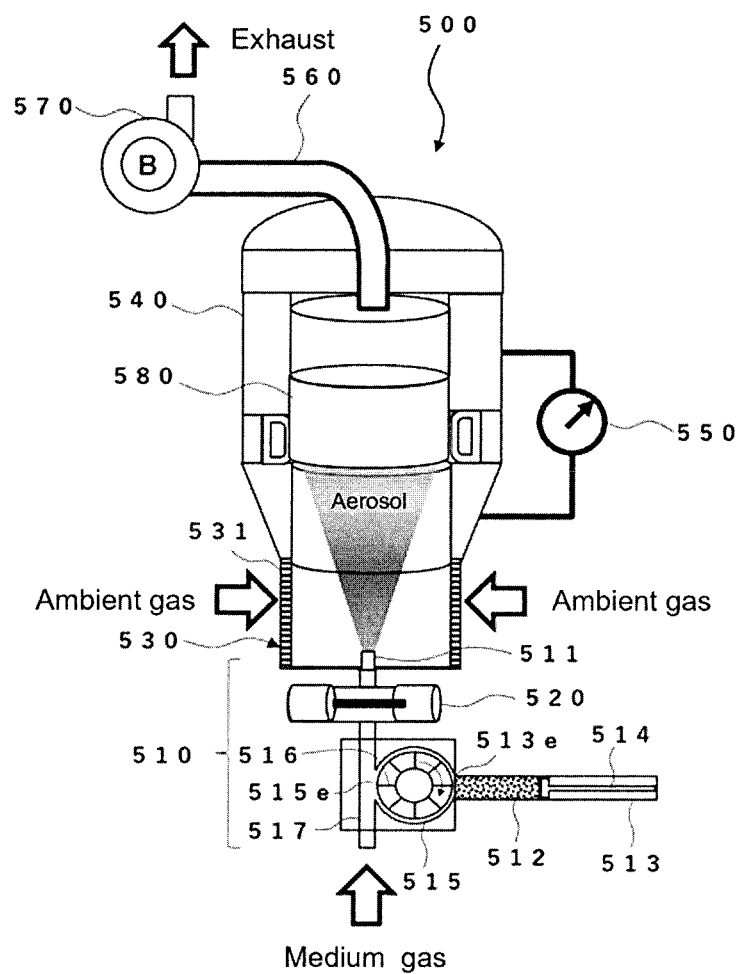
FIG. 5 is a schematic view for illustrating the configuration of a particle adhering device according to one embodiment of the present invention.

FIG. 5 schematically shows a device configuration of a particle adhering device (500) suitable for carrying out the step of adhering ceramic particles to the surface of the first cells of the pillar-shaped honeycomb structure (580). The particle adhering device (500) comprises an aerosol generator (510), a laser diffraction type particle size distribution measuring device (520), a gas introduction pipe (530), a holder (540), a differential pressure gauge (550), an exhaust pipe (560) and a blower (570).

The aerosol generator (510) comprises:
a cylinder (513) for storing ceramic particles (512),
a piston or a screw (514) for sending out ceramic particles (512) stored in the cylinder (513) from a cylinder outlet (513e),
a crushing chamber (515) communicating with the cylinder outlet (513e) having a rotating body (516) for crushing the ceramic particles (512) sent out from the cylinder outlet (513e), and
a gas flow path (517) for flowing a medium gas that communicates with the crushing chamber outlet (515e) in the midway and can inject an aerosol containing the medium gas and the ceramic particles (512) from a nozzle (511) attached to the tip.

The aerosol generator (510) can inject aerosol from the nozzle (511). The ceramic particles (512) adjusted to a predetermined particle size distribution are stored in the cylinder (513). The ceramic particles (512) stored in the cylinder (513) are pushed out of the cylinder outlet (513e) by a piston or a screw (514). At this time, the pushing speed can be configured to be adjustable. The ceramic particles (512) discharged from the cylinder outlet (513e) enter the crushing chamber (515). The ceramic particles (512) introduced into the crushing chamber (515) move in the crushing chamber (515) while being crushed by the rotating body (516), and are discharged from the crushing chamber outlet (515e). As the rotating body (516), for example, a rotating brush can be adopted. The rotating body (516) can be driven by a motor, and its rotation speed can be configured to be controllable.

The ceramic particles discharged from the crushing chamber outlet (515e) are mixed with the medium gas flowing through the gas flow path (517) to form an aerosol, which is injected from the nozzle (511). The nozzle (511) is preferably installed at a position and direction such that the aerosol is injected in a direction perpendicular to the inlet side end surface toward the center of the inlet side end surface of the pillar-shaped honeycomb structure (580) which is held by the holder (540).

The injection flow rate from the nozzle (511) can be controlled by using a compressed gas such as compressed air with adjusted pressure as the medium gas. A laser diffraction type particle size distribution measuring device (520) is installed in the gas flow path (517), and the particle size distribution of ceramic particles in the aerosol discharged from the aerosol generator (510) can be measured in real time. Thereby, it is possible to monitor whether or not the ceramic particles supplied to the pillar-shaped honeycomb structure (580) have a desired particle size distribution.

Fine ceramic particles have the property of easily aggregating. However, by using the aerosol generator (510) according to the present embodiment, the crushed ceramic particles are injected, so that ceramic particles having a particle size distribution as intended in which aggregation is suppressed can be adhered to the surface of the first cells.

The aerosol injected from the aerosol generator (510) passes through the gas introduction pipe (530) by the suction force from the blower (570), and then is sucked into the first cells of the pillar-shaped honeycomb structure filter from the inlet side end surface of the pillar-shaped honeycomb structure which is held by the holder (540). The ceramic particles in the aerosol sucked into the first cells adhere to the surface of the first cells.

A plurality of ventilation holes (531) is provided on the wall surface of the gas introduction pipe (530), and it is possible to suck in ambient gas such as air. Thereby, the gas flow rate flowing into the gas introduction pipe (530) can be adjusted according to the suction force from the blower (570). A filter may be installed in the ventilation holes (531) for the reason of preventing foreign substance from entering.

An exhaust pipe (560) connected to the blower (570) is provided on the downstream side of the outlet side end surface of the pillar-shaped honeycomb structure (580). Therefore, after the aerosol from which the ceramic particles have been removed is discharged from the outlet side end surface of the pillar-shaped honeycomb structure (580), it passes through the exhaust pipe (560) and then is exhausted through the blower (570).

When the step of adhering the ceramic particles to the surface of the first cells is continued, the pressure loss between the inlet side end surface and the outlet side end surface of the pillar-shaped honeycomb structure increases as the amount of the ceramic particles adhered increases. By obtaining the relationship between the adhesion amount of ceramic particles and the pressure loss in advance, the end point of the step of adhering the ceramic particles to the surface of the first cells can be determined based on the pressure loss. Therefore, the particle adhering device (500) can be provided with a differential pressure gauge (550) to measure the pressure loss between the inlet side end surface and the outlet side end surface of the pillar-shaped honeycomb structure (580), and the end point of the process may be determined based on the indication of the differential pressure gauge.

When the step of adhering the ceramic particles to the surface of the first cells is carried out, the ceramic particles adhere to the inlet side end surface of the pillar-shaped honeycomb structure (580). Therefore, it is preferable to remove the ceramic particles by suction with a vacuum or the like while leveling the inlet side end surface with a jig such as a scraper.

<4. Formation of Porous Film>

Next, in one embodiment of the method for manufacturing a pillar-shaped honeycomb structure filter according to the present invention, a step of performing a heat-oxidation treatment on the pillar-shaped honeycomb structure in which the ceramic particles are adhered to the surface of the first cells to form a porous film comprised of the ceramic particles having an oxide film thereon is carried out.

When forming the oxide film, it is effective in significantly improving the peeling resistance of the porous film to perform a heat-oxidation treatment on the pillar-shaped honeycomb structure in which the ceramic particles are adhered to the surface of the first cells so as to satisfy the following relational expressions (1) to (3).

$$0.05 \leq T \leq 0.5 \quad (1)$$

$$0.05 \leq T/D50 \quad (2)$$

$$4 \leq \{(W_1 - W_0)/W_0 \times 100\}/D50 \quad (3)$$

(wherein,
T (unit: μm) represents the average thickness of the oxide film;
D50 (unit: μm) represents the median diameter of the ceramic particles in the volume-based cumulative particle size distribution measured by a laser diffraction/scattering method;
$W_0$ (unit: g) represents a mass of the ceramic particles adhered to the pillar-shaped honeycomb structure before the heat-oxidation treatment; and
$W_1$ (unit: g) represents a mass of the ceramic particles adhered to the pillar-shaped honeycomb structure after the heat-oxidation treatment.)

The lower limit of the average thickness T of the oxide film is preferably 0.05 μm or more, more preferably 0.10 μm or more, and even more preferably 0.15 μm or more, for the reason of improving the peeling resistance. The upper limit of the average thickness of the oxide film is not particularly limited, but may be, for example, 1.0 μm or less, or 0.5 μm or less.

In the present specification, the average thickness T of the oxide film is measured by the following method. First, a measurement sample of the first cell in which the porous film is formed on the surface is cut out from the pillar-shaped honeycomb structure into a size (example: 10 mm square) that enables cross-sectional observation of the porous film. Next, an in-lens secondary electron image is captured at a magnification of 4000 using a Field Emission Scanning Electron Microscope (abbreviation: FE-SEM) (for example, model ULTRA55 available from ZEISS). In the captured image, the outer peripheral portion of the ceramic particles constituting the porous film appears white due to charging. Accordingly, the thickness of the charging portion is measured using the line profile function of an image analysis software (for example, HALCON). Specifically, a profile line in a direction perpendicular to the outer peripheral edge of the porous film is drawn, and the length of the profile line crossing the charging portion is defined as the thickness of the charging portion. In cases where the thickness of the charging portion varies in one ceramic particle, the thickest portion of the charging portion is defined as the thickness of the charging portion of the particle. Then, the average thickness of the charging portions of arbitrary 30 ceramic particles is defined as the measured value for the sample. It can be confirmed by a Field Emission Electron Probe Micro Analyzer (abbreviation: FE-EPMA) (for example, model JXA-8500F type available from JEOL Ltd.) that the charging portion is an oxide film composed of $SiO_2$. A total of 9 or more measurement samples are collected from the pillar-shaped honeycomb structure evenly, and the average value of the thicknesses of these oxide films is defined as the measured value.

T/D50 represents the ratio of the average thickness T of the oxide film to the median diameter (D50) of the ceramic particles in a volume-based cumulative particle size distribution measured by a laser diffraction/scattering method. The ratio is controlled because the appropriate range of the average thickness T of the oxide film changes depending on the median diameter (D50) of the ceramic particles. The lower limit of T/D50 is preferably 0.05 or more, more preferably 0.10 or more, and even more preferably 0.15 or more for the reason of ensuring peeling resistance. The upper limit of T/D50 is not particularly limited, but can be, for example, 5 or less, and typically 2 or less.

$\{(W_1-W_0)/W_0 \times 100\}/D50$ represents the ratio of the mass increase rate of the ceramic particles due to oxidation to the median diameter (D50) of the ceramic particles in the volume-based cumulative particle size distribution measured by the laser diffraction/scattering method. The ratio is controlled because the appropriate range of the mass increase rate of the ceramic particles changes depending on the median diameter (D50) of the ceramic particles. The lower limit of $\{(W_1-W_0)/W_0\times100\}/D50$ is 4 or more, more preferably 6 or more, and even more preferably 10 or more for the reason of ensuring peeling resistance. The upper limit of $\{(W_1-W_0)/W_0\times100\}/D50$ is not particularly limited, but can be, for example, 100 or less, 98 or less, or 96 or less.

It is also preferable to control the mass increase rate itself of the ceramic particles due to oxidation. Specifically, the heat-oxidation treatment is preferably carried out such that the lower limit of $(W_1-W_0)/W_0\times100(\%)$ is 4% or more, more preferably 6% or more, and even more preferably 10% or more for the reason of improving the peeling resistance. In addition, in the heat-oxidation treatment, the upper limit of $(W_1-W_0)/W_0\times100(\%)$ is not particularly limited, but may be 50% or less (in the case of SiC) or 29% or less (in the case of SiN), and also may be 45% or less (in the case of SiC) or 26% or less (in the case of SiN)

As to the specific conditions for the heat-oxidation treatment, for example, the pillar-shaped honeycomb structure in which ceramic particles are adhered to the surface of the first cells is kept at a maximum temperature of 1000° C. or higher for 1 hour or longer, typically at a maximum temperature of 1100 to 1400° C. for 1 to 6 hours, under oxygen-containing conditions such as air. The average thickness T of the oxide film can be increased as the temperature is higher and the time is longer during the heat-oxidation treatment. Further, the mass increase rate of the pillar-shaped honeycomb structure due to oxidation can also be increased as the temperature is higher and the time is longer during the heat-oxidation treatment. The average temperature rising rate at the time of temperature rising from room temperature (25° C.) to the maximum temperature is preferably 100° C./Hr or more for the reason of increasing the production rate. Further, in the heat treatment, the average temperature rising rate at the time of temperature rising from room temperature (25° C.) to the maximum temperature is preferably 200° C./Hr or less for the reason of suppressing occurrence of cracks. In addition, the average temperature dropping rate at the time of temperature dropping from the maximum temperature to room temperature (25° C.) is preferably 200° C./Hr or less for the reason of suppressing occurrence of cracks and reducing the burden on the kiln material. The heat-oxidation treatment can be carried out, for example, by placing a pillar-shaped honeycomb structure in an electric furnace or a gas furnace.

In one embodiment, the average film thickness of the porous film is 2 to 50 μm. When the average film thickness of the porous film is 2 μm or more, preferably 3 μm or more, there is an advantage that the collection efficiency can be improved. Further, when the average film thickness of the porous film is 50 μm or less, preferably 40 μm or less, more preferably 30 μm or less, and even more preferably 20 μm or less, there is an advantage that an increase in pressure loss can be suppressed.

In the present specification, the average film thickness of the porous film of the pillar-shaped honeycomb structure filter is measured by the following procedures. The direction in which the first cells of the pillar-shaped honeycomb structure filter extend is set as the extending direction of a coordinate axis, and the coordinate value of the inlet side end surface is set to 0, and the coordinate value of the outlet side end surface it set to X. Next, the average thickness of the porous film is measured in 5 field of views at each of the following 6 locations, $A_1$, $A_2$, $A_3$, $B_1$, $B_2$, and $B_3$, and the average value of all of these averages is taken as the average film thickness of the porous film of the pillar-shaped honeycomb structure.

$A_1$: The central portion in the range of coordinate values 0.1X to 0.3X in a cross-section orthogonal to the direction in which the first cells of the pillar-shaped honeycomb structure filter extend.

$B_1$: The outer peripheral portion in the range of coordinate values 0.1X to 0.3X in a cross-section orthogonal to the direction in which the first cells of the pillar-shaped honeycomb structure filter extend.

$A_2$: The central portion in the range of coordinate values 0.4X to 0.6X in a cross-section orthogonal to the direction in which the first cells of the pillar-shaped honeycomb structure filter extend.

$B_2$: The outer peripheral portion in the range of coordinate values 0.4X to 0.6X in a cross-section orthogonal to the direction in which the first cells of the pillar-shaped honeycomb structure filter extend.

$A_3$: The central portion in the range of coordinate values 0.7X to 0.9X in a cross-section orthogonal to the direction in which the first cells of the pillar-shaped honeycomb structure filter extend.

$B_3$: The outer peripheral portion in the range of coordinate values 0.7X to 0.9X in a cross-section orthogonal to the direction in which the first cells of the pillar-shaped honeycomb structure filter extend.

The central portion and the outer peripheral portion of the pillar-shaped honeycomb structure filter when measuring the average thickness of the porous film are determined as follows. When the pillar-shaped honeycomb structure filter is observed from the cross-section orthogonal to the direction in which the first cells extend, a line segment is drawn from the center of gravity of the cross-section toward the outer surface of the outer peripheral side wall, the extending direction of the line segment is set as the extending direction of a coordinate axis, and the coordinate value of the center of gravity is set to 0, and the coordinate value of the outer surface of the outer peripheral side wall is set to R. In this case, in the line segment, the range of the coordinate values 0 to 0.2R is the central portion, and the range of the coordinate values 0.7R to 0.9R is the outer peripheral portion. By drawing a large number of such line segments in the cross-section and gathering the central portion and the outer peripheral portion of each line segment, the range of the central portion and the outer peripheral portion in the cross-section can be obtained.

The average thickness of the porous film at each location of $A_1$, $A_2$, $A_3$, $B_1$, $B_2$, and $B_3$ is measured by the following method. A cross-section, which is parallel to the direction in which the first cells extend and parallel to the line segment from the outer surface of the outer peripheral side wall toward the center of gravity, is cut out from a location (central portion or outer peripheral portion) where the average thickness of the porous film of the pillar-shaped honeycomb structure filter is to be determined. The cross-section is observed with a 3D shape measuring machine (for example, VR-3200 available from KEYENCE CORPORATION) under the conditions of a magnification of 25 times and an observation field of view of 12.5 mm (horizontal)× 9.5 mm (vertical). At this time, the observation is performed such that the lateral direction of the observation field of view is parallel to the direction in which the first cells extend.

Figure 4:
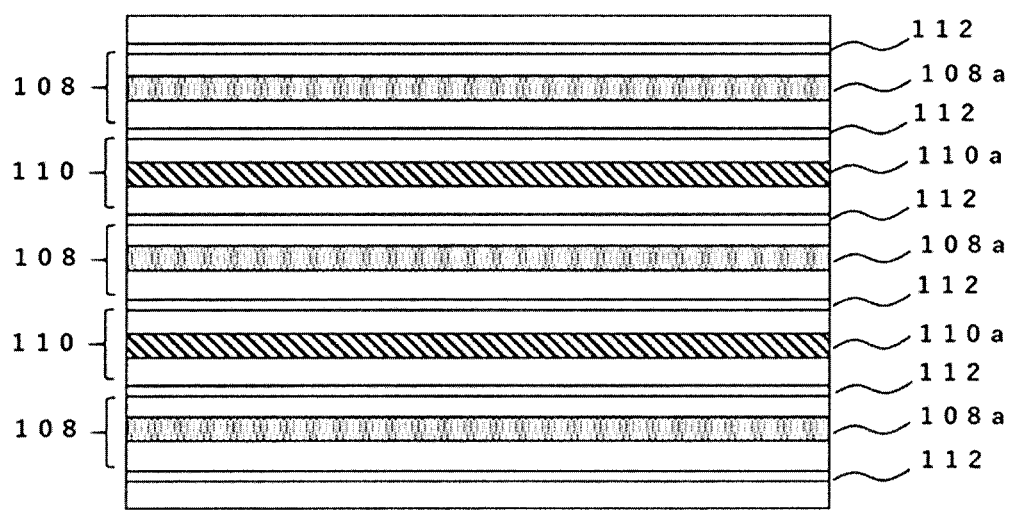
FIG. 4 is a schematic view of a cross-section of a pillar-shaped honeycomb structure filter cut out in order to measure the average thickness of the porous film.

FIG. 4 shows a schematic view of a cut-out cross-section. By cross-sectional observation, the first cells (108) in which a porous film is formed and the second cells (110) in which a porous film is not formed are identified. Next, three first cells (108) adjacent to each other at the position closest to the center on the cross-section are identified. In addition, the central regions (110a) (reference planes) of the two second cells (110) sandwiched between the three adjacent first cells (108) at the position closest to the center on the cross-section are identified, and leveling is performed with image processing software (for example, software attached to the 3D shape measuring machine VR-3200 available from KEYENCE CORPORATION) so that the reference planes are the most horizontal based on the profiles of these two regions. After the leveling, the areas of the central regions (110a) of the two second cells (110) are designated, and the average height H2 of the regions is measured. Further, after the leveling, for the areas of the central regions (108a) of the three first cells (108) are designated, and the average height H1 of the regions is measured. The difference between the average height H1 and the average height H2 in one field of view is defined as the average thickness of the porous film in this field of view. The central regions (108a, 110a) refer to an area at the center part when the distance between a pair of partition walls (112) partitioning each cell is divided into three equal parts.

For each location of $A_1$, $A_2$, $A_3$, $B_1$, $B_2$, and $B_3$, the average thickness of the porous film of 5 arbitrary field of views is determined, and the average is taken as the average thickness of the porous film at each location of $A_1$, $A_2$, $A_3$, $B_1$, $B_2$, and $B_3$. Then, the average value of all of these averages is taken as the average film thickness of the porous film of the pillar-shaped honeycomb structure filter.

EXAMPLES

Hereinafter, examples for better understanding the present invention and its advantages will be described, but the present invention is not limited to the examples.
(1) Manufacture of Pillar-Shaped Honeycomb Structure Filter To 100 parts by mass of the cordierite-forming raw material, 3 parts by mass of pore-forming material, 55 parts by mass of dispersion medium, 6 parts by mass of organic binder, and 1 part by mass of dispersant were added, mixed and kneaded to prepare a green body. Alumina, aluminum hydroxide, kaolin, talc, and silica were used as the cordierite-forming raw material. Water was used as the dispersion medium, a water-absorbing polymer was used as the pore-forming material, hydroxypropylmethyl cellulose was used as the organic binder, and fatty acid soap was used as the dispersant.

This green body was put into an extrusion molding machine and extruded through a die having a predetermined shape to obtain a cylindrical honeycomb formed body. The obtained honeycomb formed body was subject to dielectric drying and hot air drying, and then both end surfaces were cut so as to have predetermined dimensions to obtain a honeycomb dried body.

The obtained honeycomb dried body was sealed with cordierite so that the first cells and the second cells were alternately arranged adjacent to each other. Then it was degreased by heating at about 200° C. in an air atmosphere, and further fired at 1420° C. for 5 hours in an air atmosphere to obtain a pillar-shaped honeycomb structure.

The specifications of the pillar-shaped honeycomb structure were as follows.
Overall shape: cylindrical shape with a diameter of 132 mm and a height of 120 mm
Cell shape in a cross-section perpendicular to the cell flow path direction: square
Cell density (number of cells per unit cross-section area): 200 cpsi
Average pore diameter 9 μm
Porosity 55%
Partition wall thickness: 8 mil (200 μm) (nominal value based on the die specifications)

Ceramic particles were adhered to the surface of the first cells of the pillar-shaped honeycomb structure prepared as above by using the particle adhering device having the configuration shown in FIG. 5. The operating conditions of the particle adhering device were as follows.
Aerosol generator: RBG2000 available from PALAS
Ceramic particles stored in the cylinder: Listed in Table 1 (In the table, "main raw material" means that the indicated substance occupies 90% by mass or more). (The particle size distribution of the ceramic particles stored in the cylinder was changed according to the test number.)
Medium gas: dry air
Ambient gas: air atmosphere
Average flow rate of aerosol flowing in the pillar-shaped honeycomb structure: 3000 L/Min
Laser diffraction type particle size distribution measuring device: Insitec Spray available from MALVERN The particle size distribution of the ceramic particles discharged via the aerosol was measured with the laser diffraction type particle size distribution measuring device during the operation of the particle adhering device, and median diameter (D50) was measured. The results are shown in Table 1. From this result, it was confirmed that in each of the Examples and Comparative Examples, the particle size distribution of the ceramic particles stored in the cylinder was substantially the same, and no aggregation occurred.

For the obtained pillar-shaped honeycomb structure to which the ceramic particles adhered, the ceramic particles adhering to the inlet side end surface were sucked and removed by vacuum while the inlet side end surface was leveled with a scraper. After that, the pillar-shaped honeycomb structure was placed in a batch-type electric furnace for heat-oxidation treatment in an air atmosphere under various conditions of maximum temperature and maximum temperature keeping time shown in Table 1 to form a porous film on the surface of the first cells, and thereby obtaining a pillar-shaped honeycomb structure filter. During the heat-oxidation treatment, in all the test examples, at the time of temperature rising, the average temperature rising rate from room temperature (25° C.) to the maximum temperature was set to 100° C./Hr, and at the time of temperature dropping, the average temperature dropping rate from the maximum temperature to room temperature (25° C.) was set to 100° C./Hr. In addition, the pillar-shaped honeycomb structure filters were prepared as many as necessary for carrying out the following characteristic evaluation.
(2. Characteristics of Porous Film)
[Oxidation Mass Increase Rate]

For each pillar-shaped honeycomb structure filter obtained by the above manufacturing method, the oxidation mass increase ratio $\{(W_1-W_0)/W_0 \times 100\}$ was determined by the method described above. Further, based on this result, the ratio of the oxidation mass increase rate to the median diameter (D50) of the ceramic particles (oxidation mass increase rate/D50=$\{(W_1-W_0)/W_0 \times 100\}/D50$) was determined. The results are shown in Table 1.
[Average Thickness of Oxide Film]

Figure 7:
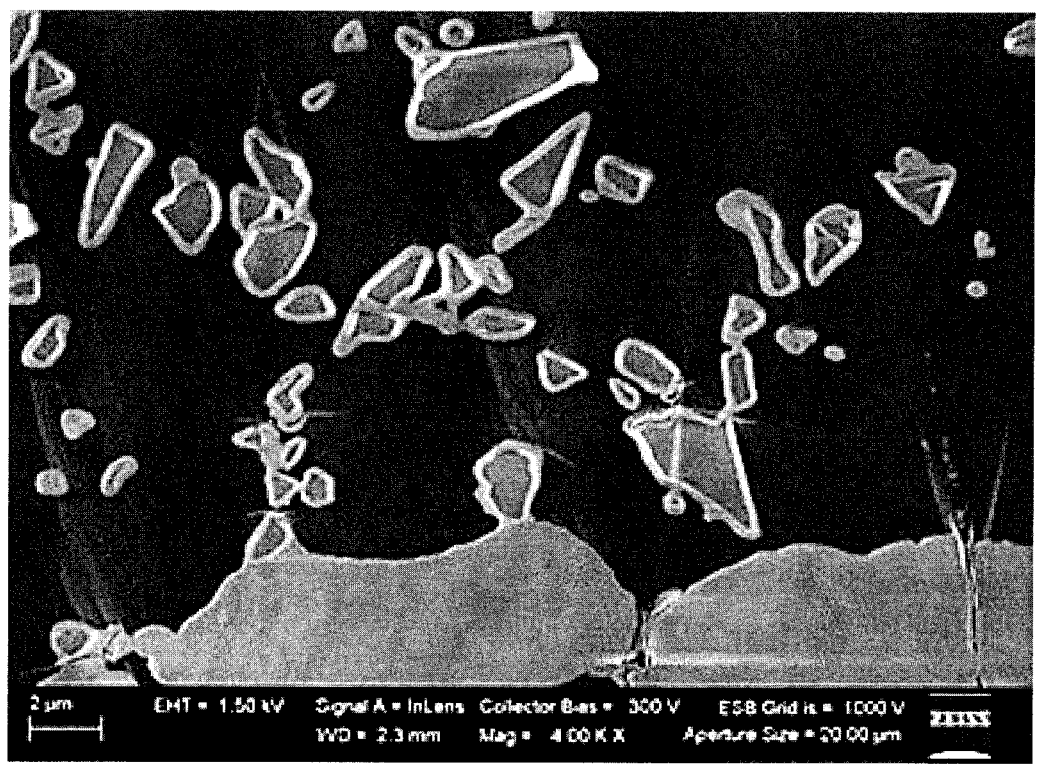
FIG. 7 is an example of an FE-SEM image of ceramic particles constituting the porous film in Example 1.

For each pillar-shaped honeycomb structure filter obtained by the above manufacturing method, the average thickness T of the oxide film formed on the surface of the porous film was measured by the method described above. The device used for the measurement was FE-SEM (model ULTRA55 available from ZEISS). Image analysis software (HALCON) was used for the thickness of the charging portion. Further, based on this result, the ratio of the average thickness of the oxide film to the median diameter (D50) of the ceramic particles (average thickness of the oxide film/D50=T/D50) was determined. The results are shown in Table 1. FIG. 7 shows an example of an FE-SEM image of the ceramic particles constituting the porous film in Example 1. An elemental analysis of the charging portion was performed by FE-EPMA (model JXA-8500F type available from JEOL Ltd.), and it was confirmed that the charging portion was composed of $SiO_2$.

[Average Film Thickness of Porous Film]

The average film thickness of the porous film of each pillar-shaped honeycomb structure filter obtained by the above manufacturing method was measured by the method described above. The 3D shape measuring machine used for the measurement was VR-3200 available from KEYENCE CORPORATION. The results are shown in Table 1.

[Evaluation of Peeling Resistance]

Figure 6:
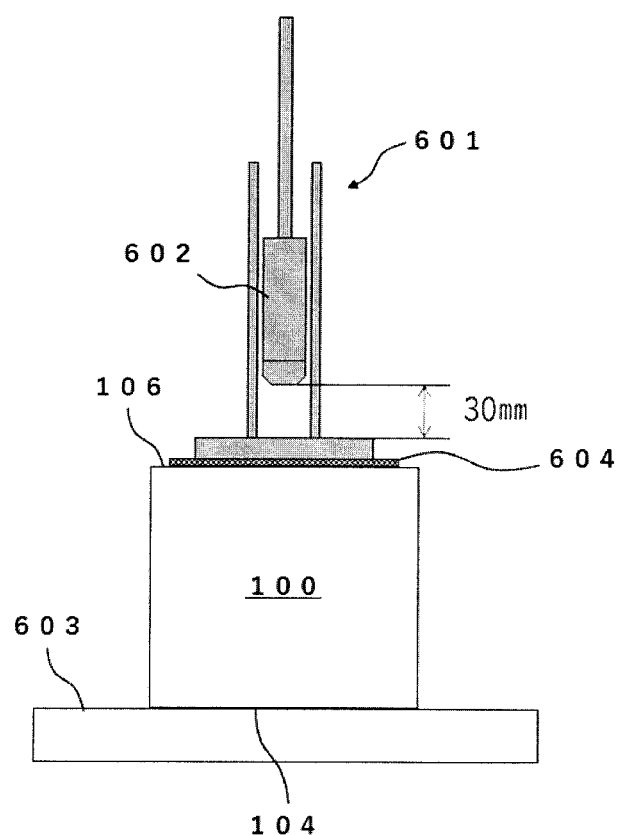
FIG. 6 is a schematic view for explaining a method for evaluating peeling resistance.

For each pillar-shaped honeycomb structure filter obtained by the above manufacturing method, a peeling resistance was evaluated by performing the following peeling test. FIG. 6 shows a schematic view for explaining a method for evaluating peeling resistance. The pillar-shaped honeycomb structure filter (100) was placed on a workbench (603) with the inlet side end surface (104) facing down. A rubber sheet (604) with a thickness of 3 mm (hardness 70 as measured by a type A durometer in accordance with JIS K6253-3: 2012) was laid on the outlet side end surface (106) of the pillar-shaped honeycomb structure filter (100), and a small weight drop type impact tester (601) was placed on it. The small weight drop type impact tester (601) was configured to be able to drop a weight (602) of 940 g from an arbitrary height. Here, the weight (602) was pulled up and released from a height of 30 mm to give an impact to the pillar-shaped honeycomb structure filter (100). The weight of the porous film before the peeling test was (2), the weight of the porous film after the peeling test was (3), and ((2)−(3))/(2)×100(%) was the peeling rate. If it was 5% or more, it was evaluated that peeling occurred.

(3. Discussion)

From the results in Table 1, it can be understood that the porous films satisfying all of the following was excellent in peeling resistance.

$$0.05 \leq T \leq 0.5 \tag{1}$$

$$0.05 \leq T/D50 \tag{2}$$

$$4 \leq \{(W_1 - W_0)/W_0 \times 100\}/D50 \tag{3}$$

DESCRIPTION OF REFERENCE NUMERALS

100 Pillar-shaped honeycomb structure filter
102 Outer peripheral side wall
104 Inlet side end surface
106 Outlet side end surface
108 First cell
109 Sealing portion
110 Second cell
112 Partition wall
114 Porous film
114 Porous membrane
500 Particle adhering Device
510 Aerosol generator
511 Nozzle
512 Ceramic particles
513 Cylinder
513e Cylinder outlet
514 Piston or screw
515 Crushing chamber
515e Crushing chamber outlet
516 Rotating body
517 Gas flow path
520 Laser diffraction type particle size distribution measuring device
530 Gas introduction pipe
531 Ventilation hole
540 Holder
550 Differential pressure gauge
560 Exhaust pipe
570 Blower
580 Pillar-shaped honeycomb structure

TABLE 1

| | Ceramic particles | | Conditions of heat oxidation treatment | | Characteristics of porous film | | | | | |
|---|---|---|---|---|---|---|---|---|---|---|
| Unit | Main raw material [-] | D50 [μm] | Maximum temperature [° C.] | Maximum temperature keeping time [hr] | Oxidation mass increase rate [%] | Average thickness of oxide film [μm] | Oxidation mass increase rate/D50 [-] | Average thickness of oxide film/D50 [-] | Average film thickness of porous film [μm] | Peeling rate [%] |
| Example 1 | SiC | 2.4 | 1,100 | 3.5 | 17 | 0.20 | 7.1 | 0.09 | 21 | 0.4 |
| Example 2 | SiC | 0.4 | 1,100 | 3.5 | 35 | 0.42 | 87.5 | 1.05 | 5 | 0.1 |
| Example 3 | SiC | 1.1 | 1,100 | 3.5 | 23 | 0.28 | 20.9 | 0.25 | 11 | 0.1 |
| Example 4 | SiC | 3.2 | 1,100 | 3.5 | 15 | 0.18 | 4.7 | 0.06 | 27 | 2.7 |
| Example 5 | SiC | 2.4 | 1,000 | 1 | 10 | 0.12 | 4.2 | 0.05 | 21 | 3.5 |
| Example 6 | SiC | 0.4 | 950 | 1.5 | 5 | 0.06 | 12.5 | 0.15 | 5 | 0.8 |
| Example 7 | SiC | 5.5 | 1,200 | 4 | 26 | 0.31 | 4.7 | 0.06 | 46 | 3.2 |
| Example 8 | $Si_3N_4$ | 1.9 | 1,300 | 5 | 9 | 0.15 | 4.7 | 0.08 | 17 | 0.7 |
| Comparative Example 1 | SiC | 2.4 | 950 | 2 | 8 | 0.10 | 3.3 | 0.04 | 21 | 6.2 |
| Comparative Example 2 | SiC | 0.4 | 900 | 1 | 1 | 0.01 | 2.5 | 0.03 | 5 | 5.8 |
| Comparative Example 3 | SiC | 5.5 | 1,200 | 1 | 16 | 0.19 | 2.9 | 0.03 | 46 | 7.5 |

601 Small weight drop type impact tester
602 Weight
603 Workbench
604 Rubber sheet

The invention claimed is:

1. A method for manufacturing a pillar-shaped honeycomb structure filter, comprising:

preparing a pillar-shaped honeycomb structure comprising a plurality of first cells extending from an inlet side end surface to an outlet side end surface, opening on the inlet side end surface and having a sealing portion on the outlet side end surface, and a plurality of second cells extending from the inlet side end surface to the outlet side end surface, having a sealing portion on the inlet side end surface and opening on the outlet side end surface, the first cells and the second cells being alternately arranged adjacent to each other with a porous partition wall interposed therebetween;

adhering ceramic particles to a surface of each of the plurality of first cells by injecting an aerosol containing the ceramic particles toward the inlet side end surface while applying a suction force to the outlet side end surface to suck the injected aerosol from the inlet side end surface, wherein the ceramic particles contain 50% by mass or more in total of one or two selected from SiC and SiN, and the ceramic particles have a median diameter (D50) in a volume-based cumulative particle size distribution measured by a laser diffraction/scattering method of 0.1 to 6.0 μm; and performing a heat-oxidation treatment on the pillar-shaped honeycomb structure in which the ceramic particles are adhered to the surface of each of the plurality of first cells to form a porous film on the entire surface of each of the plurality of first cells, the porous film comprised of the ceramic particles having an oxide film thereon so as to satisfy following relational expressions (1) to (3)

$$0.05 \leq T \leq 0.5 \tag{1}$$

$$0.05 \leq T/D50 \tag{2}$$

$$4 \leq \{(W_1 - W_0)/W_0 \times 100\}/D50 \tag{3}$$

wherein, T (unit: μm) represents an average thickness of the oxide film; D50 (unit: μm) represents the median diameter of the ceramic particles in the volume-based cumulative particle size distribution measured by a laser diffraction/scattering method;

$W_0$ (unit: g) represents a mass of the ceramic particles adhered to the pillar-shaped honeycomb structure before the heat-oxidation treatment; and $W_1$ (unit: g) represents the mass of the ceramic particles adhered to the pillar-shaped honeycomb structure after the heat-oxidation treatment.

2. The method for manufacturing a pillar-shaped honeycomb structure filter according to claim 1, wherein the porous film has an average film thickness of 2 to 50 μm.

3. The method for manufacturing a pillar-shaped honeycomb structure filter according to claim 1, wherein the heat-oxidation treatment is performed so as to satisfy $4 \leq (W_1 - W_0)/W_0 \times 100 \leq 50$.

4. The method for manufacturing a pillar-shaped honeycomb structure filter according to claim 1, wherein the heat-oxidation treatment is performed under a condition of keeping the pillar-shaped honeycomb structure at a maximum temperature of 1000° C. or higher for 1 hour or longer.

5. The method for manufacturing a pillar-shaped honeycomb structure filter according to claim 1, wherein the porous partition wall contains 50% by mass or more of cordierite.

* * * * *